(12) United States Patent
Jost et al.

(10) Patent No.: US 7,664,649 B2
(45) Date of Patent: Feb. 16, 2010

(54) CONTROL APPARATUS, METHOD AND COMPUTER READABLE MEMORY MEDIUM FOR ENABLING A USER TO COMMUNICATE BY SPEECH WITH A PROCESSOR-CONTROLLED APPARATUS

(75) Inventors: Uwe Helmut Jost, Berkshire (GB); Yuan Shao, Bershire (GB)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 11/697,164

(22) Filed: Apr. 5, 2007

(65) Prior Publication Data
US 2007/0174060 A1 Jul. 26, 2007

Related U.S. Application Data

(62) Division of application No. 10/321,449, filed on Dec. 18, 2002, now Pat. No. 7,212,971.

(30) Foreign Application Priority Data

Dec. 20, 2001 (GB) .................................. 0130488.0

(51) Int. Cl.
*G10L 21/00* (2006.01)
*G10L 21/06* (2006.01)
*G06F 17/27* (2006.01)
*G06F 15/00* (2006.01)
*G05G 11/01* (2006.01)

(52) U.S. Cl. ........................... 704/275; 704/9; 704/200; 704/220; 704/276; 709/227; 709/228; 709/229; 700/17; 700/83

(58) Field of Classification Search .................. 700/17, 700/83; 704/9, 200, 220, 270, 270.1, 275–276; 709/227–229
See application file for complete search history.

(56) References Cited

U.S. PATENT DOCUMENTS 5,163,083 A 11/1992 Dowden et al.

(Continued)

FOREIGN PATENT DOCUMENTS

EP 0 816 979 1/1998

(Continued)

OTHER PUBLICATIONS

"Voice eXtensible Markup Language (VoiceXML) version 1.0", Dec. 10, 2000. <http://www.w3org/TR/2000/NOTE-voicexml-20000505> (Copy provided in parent application).

(Continued)

*Primary Examiner*—Ramesh B Patel
(74) *Attorney, Agent, or Firm*—Fitzpatrick, Cella, Harper & Scinto

(57) ABSTRACT

A control apparatus for enabling a user to communicate by speech with a processor-controlled apparatus, 1) controls a display of text data which includes a speech link that can be activated by a spoken command, 2) determines the location of a cursor displayed on a display from gaze input information, 3) changes a shape of the cursor when the cursor is located over the speech link, and 4) outputs a prompt identifying speech commands that can be used to activate the speech link when the cursor is displayed on the display in a changed state for a predetermined time located over the speech link.

13 Claims, 6 Drawing Sheets

U.S. PATENT DOCUMENTS

| | | | |
|---|---|---|---|
| 5,297,146 | A | 3/1994 | Ogawa |
| 5,807,175 | A | 9/1998 | Davis |
| 5,819,220 | A | 10/1998 | Sarukkai et al. |
| 5,983,184 | A | 11/1999 | Noguchi |
| 6,018,710 | A | 1/2000 | Wynblatt et al. |
| 6,078,310 | A | 6/2000 | Tognazzi |
| 6,111,562 | A | 8/2000 | Downs et al. |
| 6,161,126 | A | 12/2000 | Wies |
| 6,211,861 | B1 | 4/2001 | Rosenberg |
| 6,243,076 | B1 | 6/2001 | Hatfield |
| 6,269,336 | B1 | 7/2001 | Ladd et al. |
| 6,289,140 | B1 | 9/2001 | Oliver |
| 6,757,657 | B1 | 6/2004 | Kojima et al. |
| 6,801,604 | B2 | 10/2004 | Maes |
| 6,850,599 | B2 | 2/2005 | Yoshitani |
| 6,975,993 | B1 | 12/2005 | Keiller |
| 7,043,439 | B2 | 5/2006 | Jost |
| 7,072,836 | B2 | 7/2006 | Shao |
| 7,212,971 | B2 * | 5/2007 | Jost et al ..................... 704/275 |
| 2002/0010589 | A1 | 1/2002 | Nashida et al. |
| 2002/0126090 | A1 * | 9/2002 | Kirkpatrick et al. ......... 345/158 |
| 2002/0190946 | A1 * | 12/2002 | Metzger ..................... 345/156 |
| 2003/0020755 | A1 * | 1/2003 | Lemelson et al. ........... 345/786 |
| 2003/0083872 | A1 * | 5/2003 | Kikinis ....................... 704/243 |
| 2003/0088421 | A1 | 5/2003 | Maes |
| 2003/0120494 | A1 * | 6/2003 | Jost et al. ..................... 704/275 |
| 2003/0139932 | A1 | 7/2003 | Shao et al. |
| 2004/0117513 | A1 * | 6/2004 | Scott ............................. 710/1 |
| 2005/0206583 | A1 * | 9/2005 | Lemelson et al. .............. 345/7 |
| 2005/0231520 | A1 * | 10/2005 | Forest ......................... 345/581 |

FOREIGN PATENT DOCUMENTS

| | | |
|---|---|---|
| JP | 9-34837 | 2/1997 |
| JP | 10-39995 | 2/1998 |
| JP | 10-161801 | 6/1998 |
| JP | 11-110186 | 4/1999 |
| JP | 2001-75704 | 3/2001 |
| JP | 2002-007019 | 1/2002 |
| JP | 2003-216574 | 7/2003 |
| WO | 93/14454 | 7/1993 |
| WO | 00/05708 | 2/2000 |
| WO | 0008547 | 2/2000 |
| WO | 00/21232 | 4/2000 |
| WO | 02/25637 | 3/2002 |

OTHER PUBLICATIONS

B. Myers, et al., "Flexi-modal and Multi-Machine User Interfaces", Proceedings Fourth IEEE International Conference on Multimodal Interfaces, published Oct. 22, 2002, pp. 343-348. (Copy provided in parent application).

http://www.oasis-open.org/cover/dmml.html. The XML Cover Pages Dialogue Moves Markup Language (DMML), Aug. 2, 2000. (Copy provided in parent application).

DSML: A Proposal for XML Standards for Messaging Between Components of a Natural Language Dialog System in AISB Workshop on Reference Architectures and Data Standards for NL, Edinburgh, UK, Apr. 1999. (Copy provided in parent application).

N. Kambhatal, et al., "DMML: An XML Language for Interacting with Multi-modal Dialog Systems", (IBM T. J. Watson Research Center, US), Third International Workshop on Human Computer Conversation, Bellagio, Italy, (Jul. 3-5, 2000). (Copy provided in parent application).

S. Rollins, et al.," A Framework For Creating Customized Multi-Modal Interfaces For XML Documents", IEEE International Conference on Multimedia, Jul. 30, 2000 thru Aug. 2, 2000, vol. 2, pp. 933-936. (Copy provided in parent application).

* cited by examiner

CONTROL APPARATUS, METHOD AND COMPUTER READABLE MEMORY MEDIUM FOR ENABLING A USER TO COMMUNICATE BY SPEECH WITH A PROCESSOR-CONTROLLED APPARATUS

This application is a division of application Ser. No. 10/321,449, filed Dec. 18, 2002, now U.S. Pat. No. 7,212,971, issued on May 1, 2007.

This invention relates to control apparatus for enabling a user to communicate with processor-controlled apparatus.

Conventionally, a user communicates with processor-controlled apparatus such as computing apparatus using a user interface that has a display and a key input such as a keyboard and possibly also a pointing device such as a mouse. During the communication, the processor-controlled apparatus will cause the display to display various screens, windows or pages to the user prompting the user to input data and/or commands using the keys and/or pointing device. Upon receipt of data and/or commands from the user, the processor-controlled apparatus may carry out an action or may prompt the user for further commands and/or data by displaying a further screen, window or page to the user. The processor-controlled apparatus may be a computing apparatus that is running applications software such as a word processing or spreadsheet application. The computing apparatus may be configured to operate independently or may be coupled to a network. In the latter case, where the user's computing apparatus communicates with the server over a network such as the Internet then the user's computing apparatus will normally be configured as a so-called browser.

The processor-controlled apparatus need not necessarily consist of a general computing apparatus but may be, for example, a processor-controlled machine such as an item of office equipment (for example a photocopier) or an item of home equipment such as a video cassette recorder (VCR). In these cases, the computing apparatus will be provided with a control panel having a display and input keys that enable the user to conduct a dialogue with the processor-controlled machine to cause it to carry out a desired action.

As described above, the user conducts his or her part of the dialogue with the processor-controlled apparatus manually, that is by entering commands and/or data by pressing keys and/or manipulating a pointing device.

There is, however, increasing interest in providing a user with the facility to conduct a spoken dialogue with computing apparatus, especially for those cases where the user is communicating with the processor-controlled apparatus via a network such as the Internet.

Where the user's computing apparatus is configured as a browser and communicates with a server over a network, the server will send pages to be displayed by the user's computing apparatus as marked-up document files produced using a markup language such as HTML (Hypertext Markup Language) or XML (eXtensible Markup Language). These markup languages enable an applications developer to control the presentation of information to a user in a very simple manner by adding markup elements or tags to the data. This is much easier than writing a program to process the data because it is not necessary for the applications developer to think about how records are to be configured, read and stored or how individual fields are to be addressed, rather everything is placed directly before them and the markup can be inserted into the data exactly where required.

There is increasing interest in enabling a user to input commands and/or data using speech and to this end the Worldwide Web Consortium (W3C) has proposed a voice adapted markup language, VoiceXML which is based on the Worldwide Web Consortiums industry standard eXtensible Markup Language (XML). Further details of the specification for Version 1.0 of VoiceXML and subsequent developments thereof can be found at the VoiceXML and W3C web sites.

In one aspect, the present invention provides control apparatus for enabling a user to communicate by speech with processor-controlled apparatus, wherein the control apparatus is configured to cause screens or pages to be displayed to a user wherein at least some of the screens or pages are associated with data indicating that speech input is possible, and wherein the control apparatus is operable to indicate visually to the user that speech input is possible. For example, the control apparatus may be operable to cause a cursor on the display to change to indicate a location on the display associated with a speech data input. Additionally or alternatively the control apparatus may be operable to cause the display to display a speech indicator that indicates to the user where speech input is possible.

In another aspect, the present invention provides control apparatus that, when a user directs their attention to a location of a display screen at which speech input is possible, provides the user with a prompt to assist the user in formulating the word or words to be spoken.

In an embodiment, the present invention provides control apparatus that is operable to control a display to cause the display to identify visually to a user a location or locations associated with or where speech input is possible.

In another embodiment, the present invention provides control apparatus that is operable to cause a display to display a prompt to the user to assist the user in formulating a spoken command. This enables the user to formulate a correct spoken command and is particularly useful where the user is unfamiliar with the speech interface to the control apparatus and is uncertain as to what type or format of speech commands should be used.

In an embodiment, control apparatus is provided that both is configured to cause a display to visually identify to a user on a displayed screen or page a location on that displayed page or screen associated with a speech command and, in addition, is operable, when the user's attention is directed to or focussed on such a location, to provide the user with a prompt that assists the user in formulating a spoken command. This means that the displayed page or screen does not need to be cluttered with information to assist the user in conducting a spoken dialogue with the interface but rather the displayed page or screen can mimic a conventional graphical user interface with those locations on the displayed screen or page associated with speech input or command being visually identified by a specific symbol or format and with prompts to assist the user in formulating an appropriate speech input being displayed to the user only when the user's attention is focussed or directed onto a location associated with or at which speech input is possible.

Embodiments of the present invention will now be described, by way of example, with reference to the accompanying drawings, in which.

Figure 1:
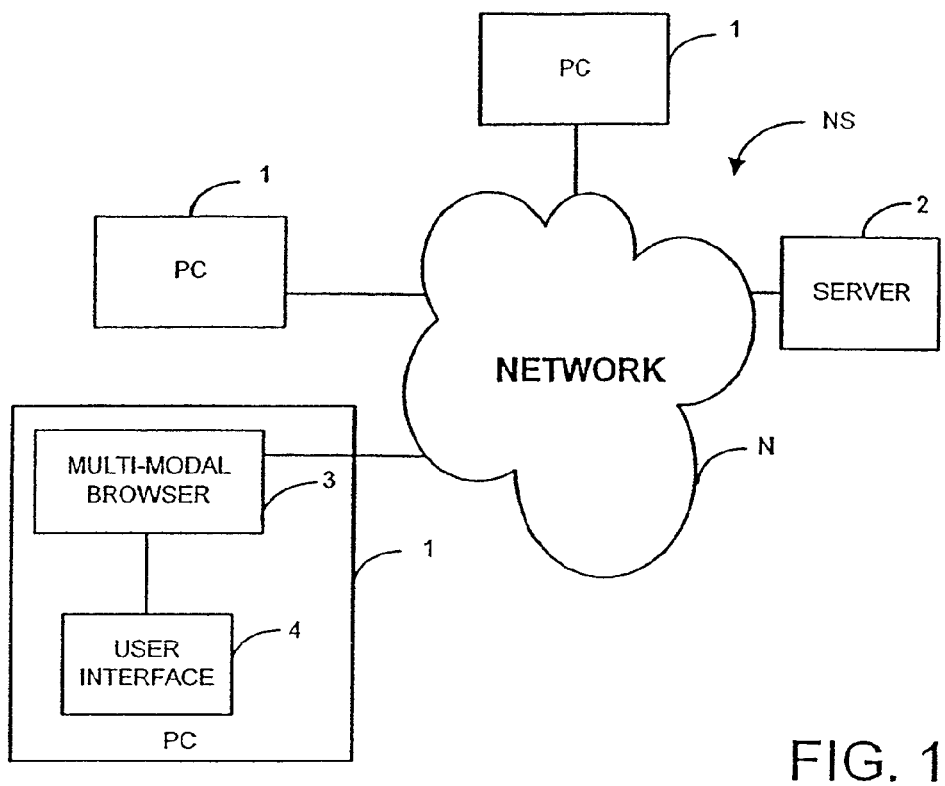
FIG. 1 shows a functional block diagram of a network system.

Referring now to the drawings, FIG. 1 shows a network system NS in which a number of computing apparatus (PC) 1 are coupled via the network N to a server to which itself is in the form of computing apparatus. The computing apparatus 1 may be personal computers, work stations or the like.

The network N may be any network that enables communication between computing apparatus, for example, a local area network (LAN), a wide area network (WAN), an Intranet or the Internet.

As shown for one of the computing apparatus 1 shown in FIG. 1, the computing apparatus 1 are configured by processor implementable instructions and data each to provide a multi-modal browser 3 coupled to a user interface 4 that enables a user to conduct a dialogue with the multi-modal browser 3 which itself communicates with the server 2 over the network N.

Figure 2:
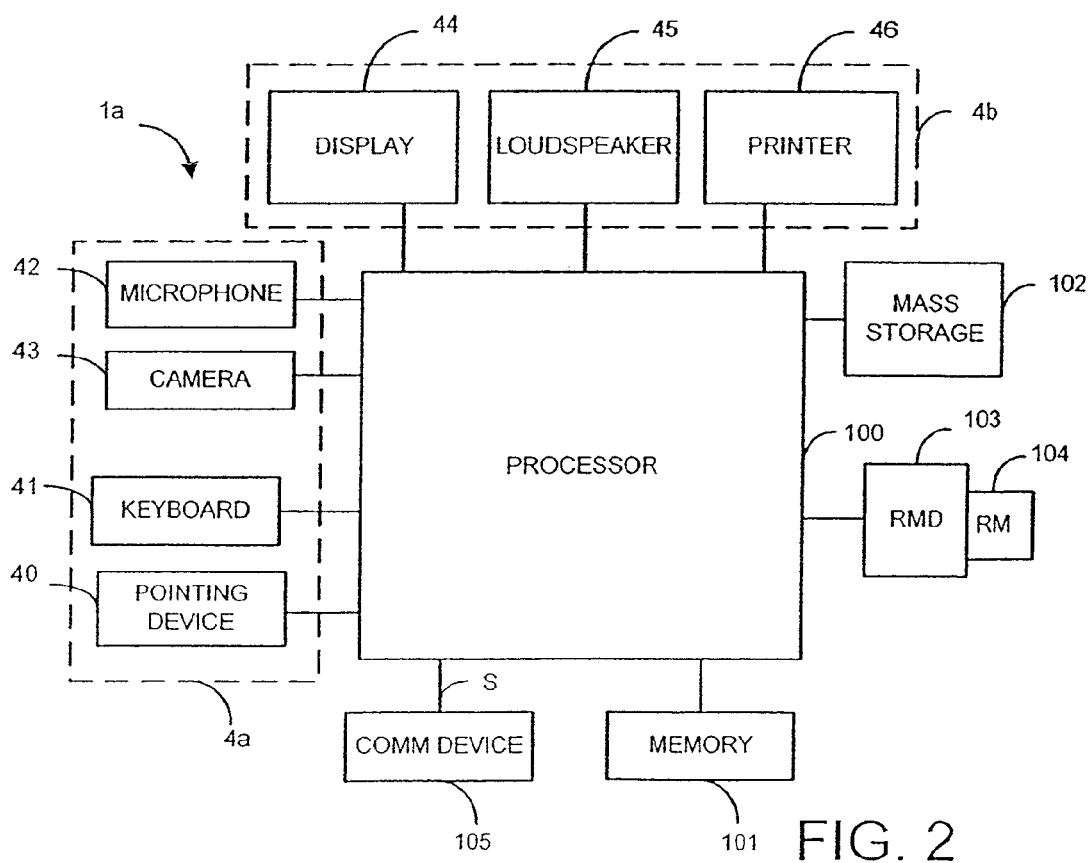
FIG. 2 shows a block diagram of a typical computing apparatus that may be used in the network shown in FIG. 1.

FIG. 2 shows a block diagram of computing apparatus 1a that may be used to provide the computing apparatus 1 shown in FIG. 1. As shown, the computing apparatus comprises a processor unit 100 having associated memory (ROM and/or RAM) 101, mass storage 102 in the form of, for example, a hard disk drive and a removable medium drive 103 for receiving a removable medium 104, for example a floppy disk and/or CD ROM and/or DVD drive. The computing apparatus 1a also includes a communications device 105 coupled to the processor unit 100. In this case, the communications device 105 comprises a MODEM that enables communications with the server 2 over the network. Where the network is a local network, then the communications device 105 may be a network card.

The computing apparatus also includes devices providing the user interface 4. The user interface 4 consists of a user input interface 4a and a user output interface 4b. The user input interface 4a includes a pointing device 40 such as a mouse, touchpad or digitizing tablet, a keyboard 41, a microphone 42 and optionally a camera 43. The user output interface 4b includes a display 44 and loudspeaker 45 plus optionally also a printer 46.

The computing apparatus 1a is configured or programmed by program instructions and/or data to provide the multi-modal browser 3 shown in FIG. 1 and to be described in detail below. The program instruction and/or data are supplied to the processor unit 100 in at least one of the following ways:

1. Pre-stored in the mass storage device 102 or in a non-volatile (for example ROM) portion of the memory 103;
2. Downloaded from a removable medium 104; and
3. As a signal S supplied via the communications device 105 from another computing apparatus, for example, over the network N.

Figure 3:
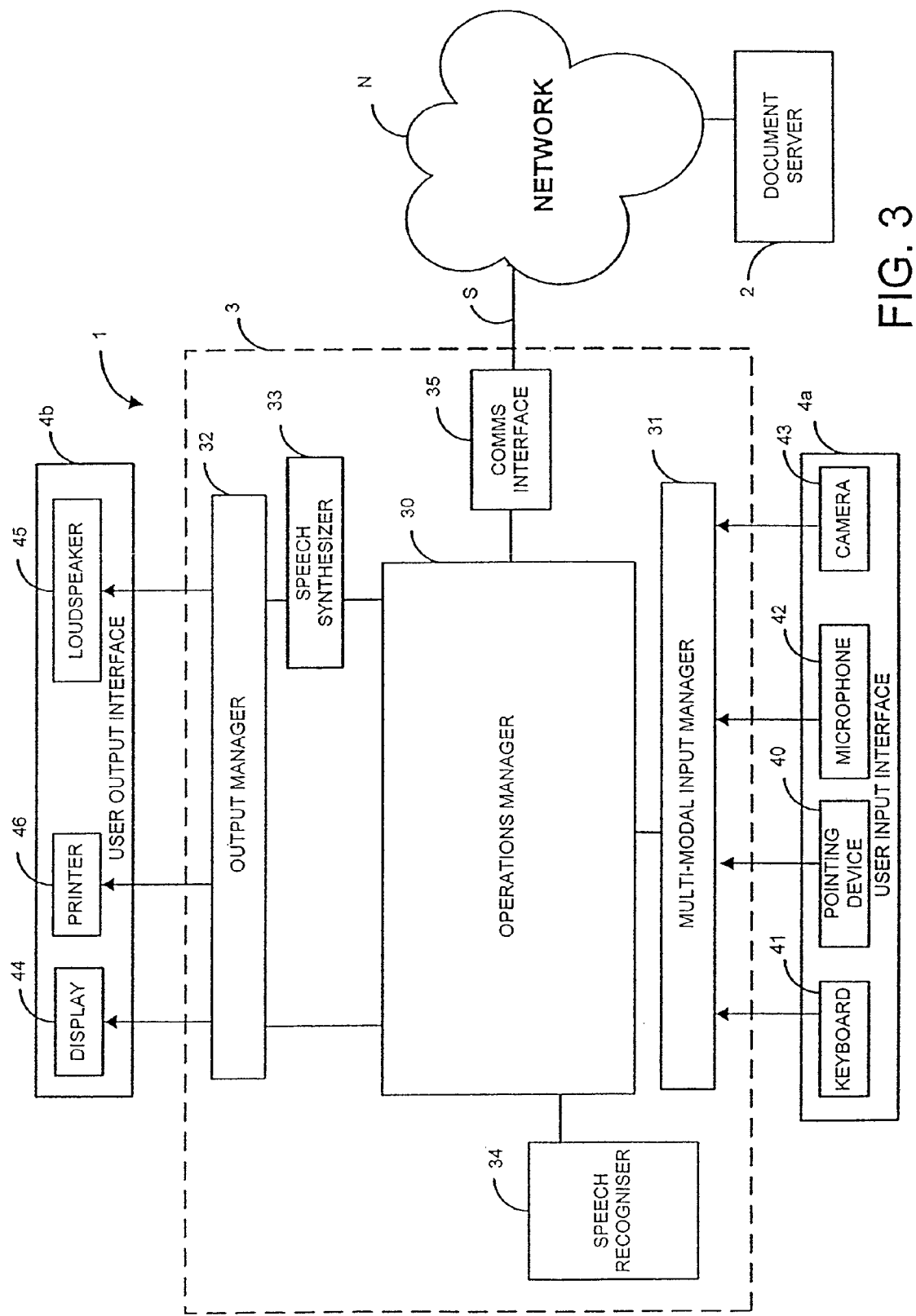
FIG. 3 shows a functional block diagram for illustrating functional components provided by the computing apparatus shown in FIG. 2 when configured to provide a multi-modal browser.

As shown in FIG. 3 the multi-modal browser 3 has an operations manager 30 that controls overall operation of the multi-modal browser. The operations manager is coupled to a multi-modal input manager 31 that is configured to receive different modality inputs from the different user input devices, in this case the pointing device 40, keyboard 41, microphone 42 and optionally the camera 43. The multi-modal input manager 31 provides from the different modality inputs commands and data that can be processed by the operations manager 30.

The operations manager 30 is also coupled to an output manager 32 that, under control of the operations manager, supplies data and instructions to the user output interface devices, in this case the display 44, loudspeaker 45 and optionally also the printer 46.

The operations manager 30 is also coupled to a speech producer, in this case a speech synthesiser 33, that converts text data to speech data in known manner to enable the output manager 32 to provide audio data to the loudspeaker 45 to enable the voice browser to output speech to the user. The operations manager 30 is also coupled to a speech recogniser 34 for enabling speech data input via the microphone 42 to the multi-modal input manager 31 to be converted into data understandable by the operations manager.

Figure 4:
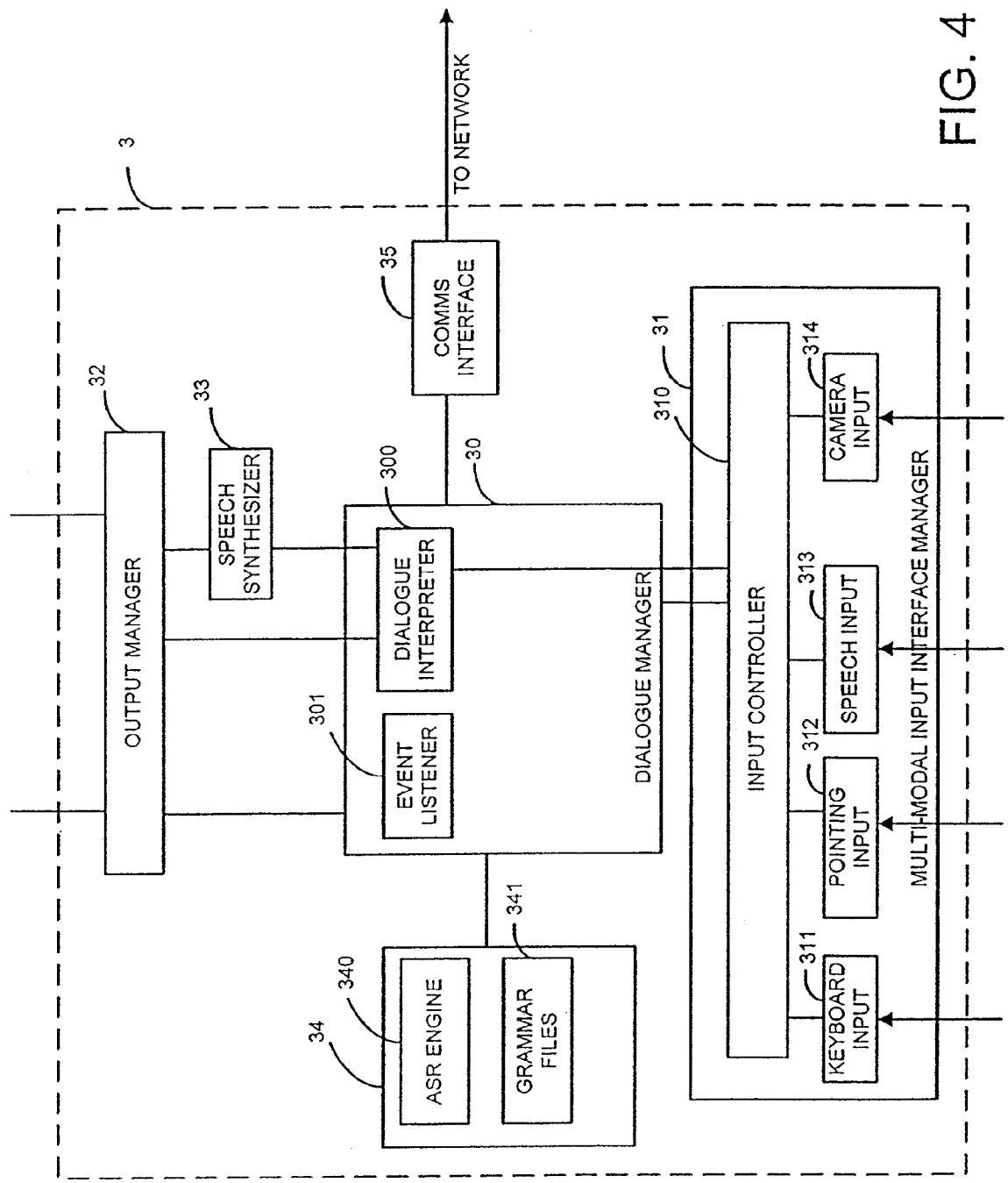
FIG. 4 shows a more detailed functional block diagram of the multi-modal browser shown in FIG. 3.

In an embodiment, the computing apparatus is configured to operate in accordance with the JAVA (™) operating platform. FIG. 4 shows a functional block diagram of the browser 3 when implemented using the JAVA operating platform.

As shown in FIG. 4, the operations manager 30 comprises a dialogue manager that includes or is associated with a dialogue interpreter 300 arranged to communicate with the server 2 over the network N and the communications interface 35 to enable the dialogue interpreter 300 to receive from the server 2 markup language document or dialogue files. The dialogue interpreter 300 is arranged to interpret and execute dialogue files to enable a dialogue to be conducted with the user. As shown in FIG. 4, the dialogue manager 30 and dialogue interpreter 300 are both coupled to the multi-modal input interface manager 31 and the output manager 32 with the dialogue interpreter 300 coupled to the output manager 32 both directly and via the speech synthesiser 33 to enable, where a verbal prompt is required, audio output to be provided to the user via the loudspeaker 45.

The multi-modal input manager 31 has a number of input modality modules, one for each possible input modality. The input modality modules are under the control of an input controller 310 that communicates with the dialogue manager 30. As shown in FIG. 4, the multimodal input manager 31 has a speech input module 313 that is arranged to receive speech data from the microphone 4, a pointing device input module 314 that is arranged to receive data from the pointing device 40 and a keyboard input module 311 that is arranged to receive keystroke data from the keyboard 41. As shown, the multi-modal input manager may also have a camera input module 314 for receiving input data from the camera 43.

The dialogue manager 30 also communicates with the speech recogniser 34 which comprises an automatic speech recognition (ASR) engine 340 and a grammar file store 341 that stores grammar files for use by the ASR engine 340. The grammar file store may also store grammar files for use by other modalities. Any known form of ASR engine may be used. Examples are the speech recognition engines produced by Nuance, Lernout and Hauspie, by IBM under the trade name Viavoice and by Dragon Systems Inc under the trade name Dragon Naturally Speaking.

The dialogue or document files provided to the dialogue interpreter 300 from the server 2 are written in a multi-modal markup language (MMML) that is based on XML which is the Worldwide Web Consortium industry standard eXtensible Markup Language (XML). In this regard, to facilitate comparison with the terminology of the VoiceXML (which is a speech adapted mark-up language based on XML) specification, it should be noted that the dialogue manager 30 is analogous to the VoiceXML interpreter context while the dialogue interpreter 300 is analogous to the VoiceXML interpreter and the server 2 forms the document server.

When the computing apparatus 1 is coupled to the network N via the communications interface 35, the server 2 processes requests received from the dialogue interpreter 300 via the dialogue manager 30 and, in reply, provides markup language documents files (dialogue files) which are then processed by the dialogue interpreter 300. The dialogue manager 30 may monitor user input supplied via the multi-modal input manager 31 in parallel with the dialogue interpreter 300. For example, the dialogue manager 30 may register event listeners 301 that listen for particular events such as inputs from the multi-modal input manager 31 that represent a specialist escape command takes the user to a high level personal assistant or that alter user preferences like volume or text to speech characteristics. The dialogue manager 30 may also, in known manner, register event listeners that listen for events occurring in the computer apparatus for example error messages from one or more of the input and output devices.

The dialogue manager 30 is responsible for detecting input from the multi-modal input manager 31, acquiring initial markup language document files from the server 2 and controlling, via the output manager 32, the initial response to the user's input, for example, the issuance of an acknowledgement. The dialogue interpreter 300 is responsible for conducting the dialogue with the user after the initial acknowledgement.

The markup language document files provided by the server 2 are, like VoiceXML documents, primarily composed of top level elements called dialogues and there are two types of dialogue, forms and menus. The dialogue interpreter 300 is arranged to begin execution of a document at the first dialogue by default. As each dialogue executes, it determines the next dialogue. Each document consists of forms which contain sets of form items. Form items are divided into field items which define the form, field item variables and control items that help control the gathering of the form field. The dialogue interpreter 300 interprets the forms using a form interpretation algorithm (FIA) which has a main loop that selects and visits a form item as described in greater detail in the VoiceXML specification Version 1.

When, as set out above, the dialogue manager 30 detects a user input, then the dialogue manager uses the field interpretation algorithm to access the first field item of the first document or dialogue file to provide an acknowledgement to the user and to prompt the user to respond. The dialogue manager 30 then waits for a response from the user and when a response is received via the multi-modal input manager 31, the dialogue manager 30 will, if the input is a voice or speech input, access the ASR engine 340 and the grammar files in the grammar file store that are associated with the field item and cause the ASR engine 341 to perform speech recognition processing on the received speech data. Upon receipt of the results of the speech recognition processing or upon receipt of the input from the multi-modal input manager where the input from the user is a non-spoken input, the dialogue manager 30 communicates with the dialogue interpreter 300 which then obtains from the server 2 the document associated with the received user input. The dialogue interpreter 300 then causes the dialogue manager 30 to take the appropriate action.

The user input options and the action taken by the dialogue manager in response to the user input are determined by the dialogue file that is currently being executed by the dialogue interpreter 300.

This action may consist of the dialogue interpreter 30 causing the output manager to cause the appropriate one of the user output devices (in the case the display 44 and loudspeaker 45) to provide a further prompt to the user requesting further information or may cause a screen displayed by the display 44 to change (for example, by opening a window or dropping down a drop-down menu or by causing the display to display a completely new page or screen) and/or may cause a document to be printed by the printer 44.

The input from the user may also cause the dialogue manager to establish via the communications interface 35 and the network N a link to another computing apparatus or a site maintained by another computing apparatus. In this case, the markup language document files may contain, in known manner, links that, when selected by the user using the pointing device 40, cause the dialogue manager 30 to access a particular address on the network N. For example, where the network N is the Internet, then this link (a so called "hyperlink") will instruct the dialogue manager to access either a further dialogue file or page at the same Internet site or may cause the dialogue manager to seek access to a different site on the network N.

In addition or alternatively, the multi-modal markup language with which the dialogue or document files provided by the server 2 are implemented enables a user to access such links by speech or voice commands. Thus, the multi-modal markup language provides markup language elements or tags that enable a part of a document to be marked up as providing a link that can be activated by spoken command that is a "speech link".

This is achieved in the present embodiment by providing within the dialogue files providing screen data representing screens to be displayed to the user and marked up text defining text to be displayed to the user with the text associated with access data for accessing a link that can be activated by spoken command being delimited by a pair of speech link tags. The speech link tags define the format in which the text is displayed so that, the user can identify the fact that a link can be accessed by spoken command. The speech link tag also provides an instruction to the browser 3 to change the pointing device cursor displayed on the display 44 from the user's usual cursor (the default being an arrow, for example) to a speech link representation cursor symbol when the pointing device cursor is located over the text for which the speech link is available. The speech link representation cursor symbol may be a default selected by the browser when it comes across a speech link tag or may be specified by the speech link tag. In either case, the speech link cursor symbol may be, for example, a mouth symbol. In addition, the speech link tag is associated with data defining a prompt or prompts to be displayed to the user providing the user with a hint or hints to enable the user to formulate a spoken command or actually indicating the word or words that can be used to access the link by spoken command. The speech link tag is also associated with data identifying one or more grammars stored in the grammar files store 341 that are to be used by the ASR engine 340 to process the subsequent input from the user. These grammar files may be prestored in the grammar file store 340 or may be downloaded with the document file from the network via the communications interface 35.

An example of the operation of the multi-modal browser described above will now be explained with the help of FIGS. 5 to 10.

Thus, assuming that the user has activated their browser 3, then the user may initially establish a link to a site on the network N by inputting a network address in known manner. The dialogue manager 30 then, via the communications interface 35, establishes communication with that address over the network N. In this case, the address is assumed to represent a site maintained by the server 2. Once communication has been established with the site at the server 2, then the server 2 supplies a first dialogue file or document data to the dialogue manager 30 via the communications interface 35. This is then received by the dialogue interpreter (step S1 in FIG. 5a). The dialogue interpreter 300 then interprets this dialogue file causing the display 45 to display to the user a display screen or page representing the markup language document file provided by the server 2 (step S2 in FIG. 5a). FIG. 6 shows an example of a page or display screen 50 that may be displayed to the user at step S2. As can be seen in FIG. 6, the display screen is displayed within a conventional Windows type Browser window. In this case, the site maintained by the server 2 is an on-line banking service and the display screen or page 50 is an initial or welcome screen. The display screen or page 50 also includes a speech link which in this example is defined in the markup language document file by the following marked-up portion of the document file:

```
<output>
    WELCOME To THE...
    <speech link name="banksel" prompt="bank.prom"
next="http://bank/sel">
        <grammar src= "bank.gram"/>
        BANK
    </speech link>
</output>
``` in which the speech link tag pairs (<speech link>) delimit or bound the text associated with the speech link and identify a file, in this case the file identified as "BANKSEL" that provides instructions for the browser 3 when the speech link is activated by the user.

As shown above, the output item also identifies prompt and grammar files associated with the speech link. This identification will generally be an identification of the appropriate file name. Thus, in the above example, the grammar associated with the speech link is identified as "bank.gram" while the prompt file is identified as "bank.prom". (The ellipsis in the above example indicate omitted matter, for example, the name of the bank and the possibility that other grammar files may be associated with the speech link). The prompt and grammar files may, in some cases, be pre-stored by the browser (especially where the user has accessed the site before). Generally, however, the prompt and grammar files will be supplied by the server 2 in association with the first document file with which they are to be used.

The prompt file provides data representing at least one of hints to be displayed to the user and actual speech commands that can be used to activate the speech link, to assist the user in formulating a speech command to activate the speech link. Where the user is familiar with the page, then the user may activate the speech links directly simply by inputting the appropriate speech commands using the microphone 42. However, where the user is unfamiliar with the site then the user may not be aware that a speech link exists. In the present embodiment, the existence of a speech link is highlighted to the user because the speech link tag defines a formatting for the text associated with the speech link that highlights to the user that a speech link is available or as another possibility indicates to the browser that a speech link default format should be used. In the example shown in FIG. 6, the speech link tag causes the text associated with the speech link to be placed in quotes and underlined. The underlining indicate that a link is available and the quotes indicate that this is a link that can be activated by speech input.

Figure 6:
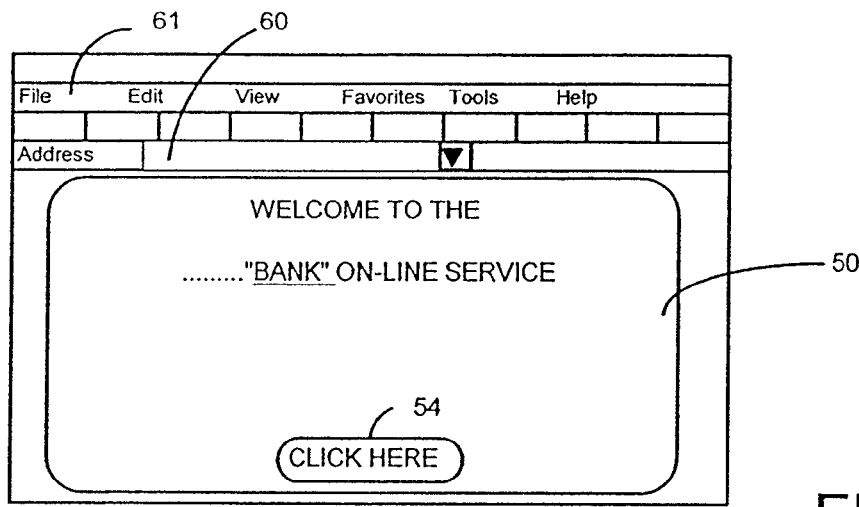
FIGS. 6 to 10 show examples of display screens or pages that may be displayed to a user by the multi-modal browser shown in FIGS. 3 and 4.
Figure 7:
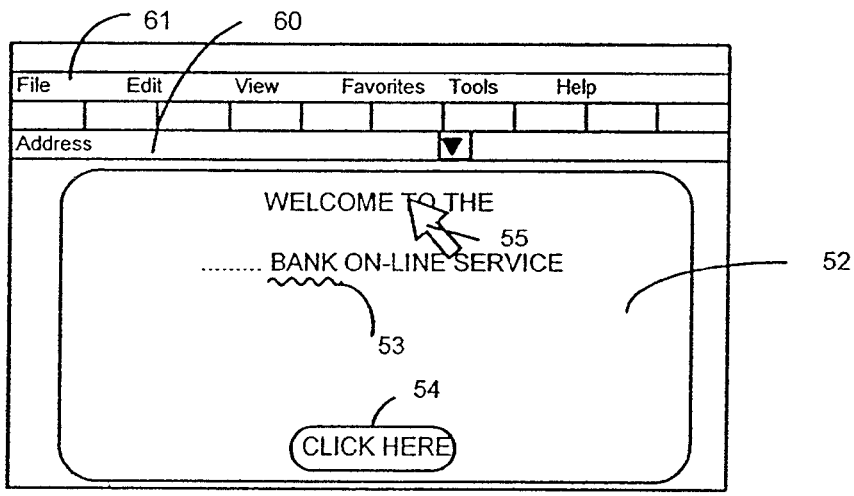
Figure 8:
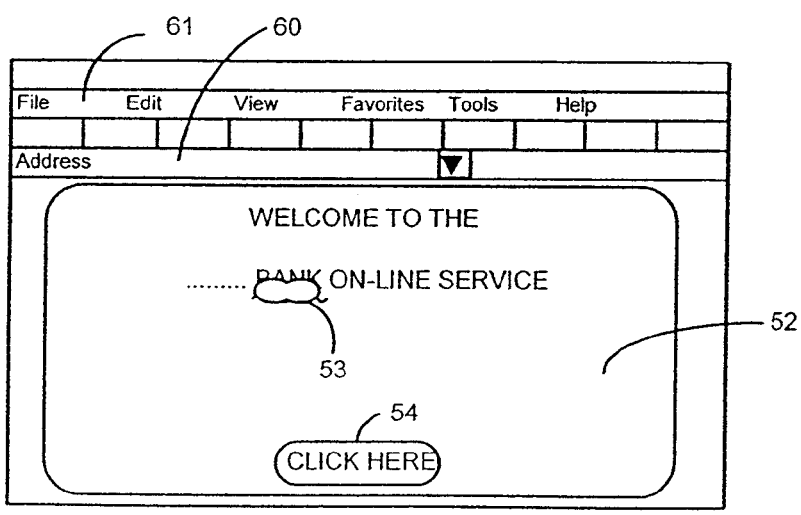

FIG. 7 shows a screen 52 similar to the screen 50 shown in FIG. 6 but where the speech link tags define a different type of formatting for the text associated with the speech link. As shown, in this case, the speech link is underlined by a wavy line 53.

Identifying text associated with a speech link enables a user familiar with the formatting used for that text to identify the speech link.

Figure 5A:
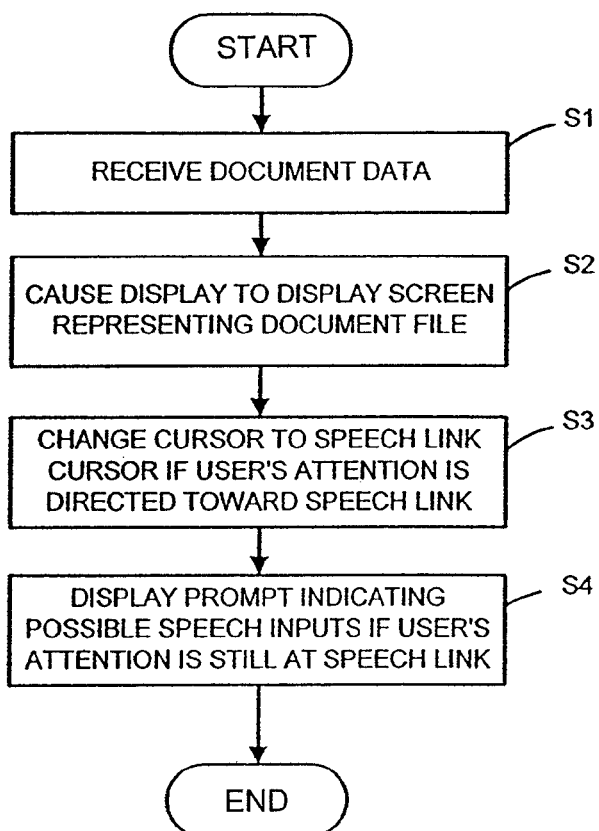
FIGS. 5a and 5b show flow charts for illustrating operation of the multi-modal browser.

In this embodiment, the markup language document or dialogue file also includes instructions to the dialogue manager 30 to cause the pointing device cursor displayed on the display screen to change when the pointing device cursor is positioned over text associated with a speech link (step S3 in FIG. 5a). Thus, as shown in FIG. 7, the pointing device cursor is normally displayed as an arrow 55. When, however, the browser 3 determines that the pointing device cursor has been positioned (by the user manipulating the pointing device) over the speech link text, then the browser 3 causes the displayed cursor to change to, in this example, a mouth shape 53, providing the user with a further indication that a speech link exists. The speech link cursor symbol may be a default symbol that is used by the browser whenever it sees the speech link or may be specified by the speech link.

If the user does not immediately move the pointing device cursor away from the speech link text, then, at step S4 in FIG. 5a, the markup language document file causes the dialogue manager 30 to retrieve the prompt file associated with the speech link and to display this prompt to the user.

Figure 9:
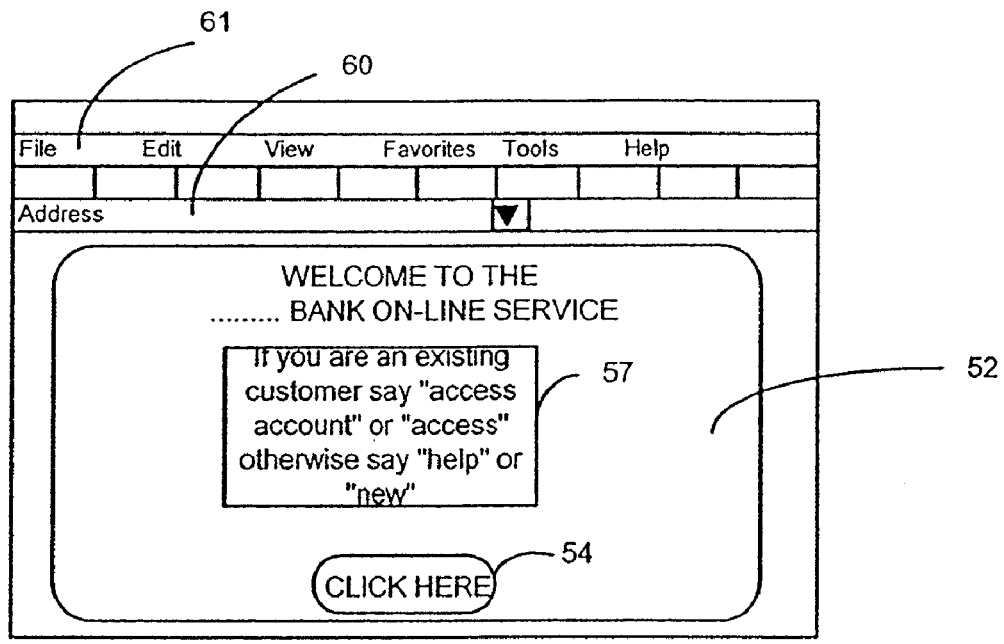
Figure 10:
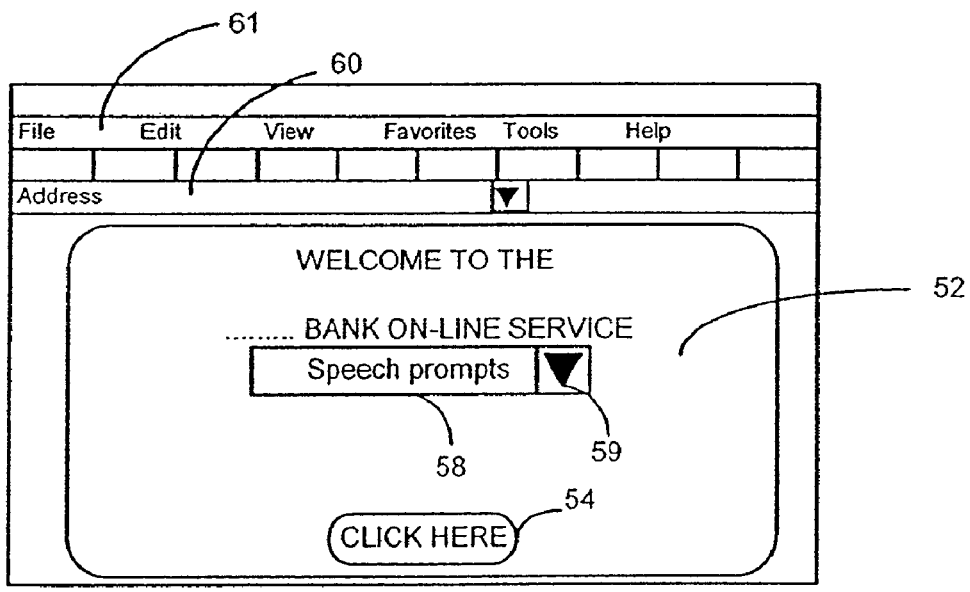

FIG. 9 shows an example of a prompt that may be displayed to the user. In this case, the prompt consists of a child window 57 which provides the user with speech commands that they may input at this speech link, in this case "access account" or "access" for an existing customer or "help" or "new" for a new customer. FIG. 10 illustrates an alternative type of prompt that may be displayed to the user at step S4. Thus, in this case, the prompt is displayed as a drop down menu 58 so that, when the user selects the arrow 59 using the pointing device, a drop down list of hints for formulating speech commands and/or actual speech commands that can be input by the user to activate this speech link appears.

Figure 5B:
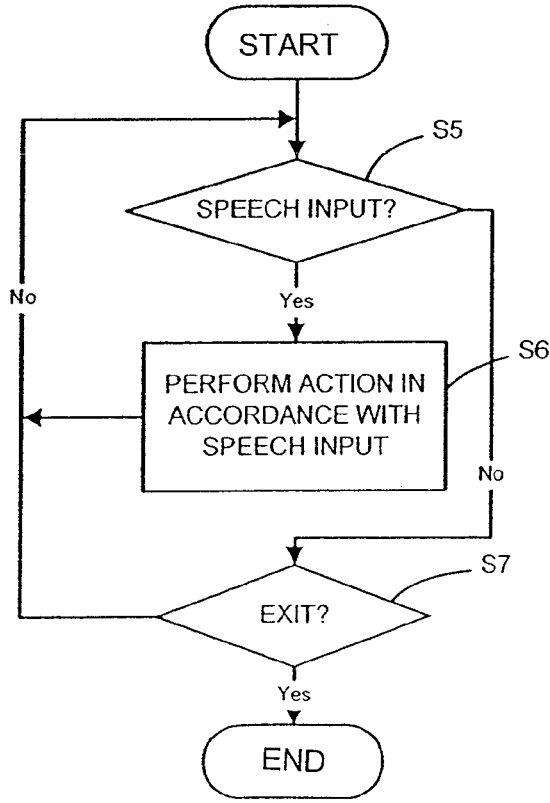

Referring now to FIG. 5b, when, at step S5, the browser 3 receives via the multi-modal input manager 31 speech data representing words spoken by the user 42, then the dialogue manager passes this data to the ASR engine 340 with instructions to access the grammar files associated with the speech link. When the dialogue manager 30 receives the results of the speech recognition process then at step S6 the dialogue manager acts in accordance with the access data associated with the speech link. This may cause the browser to carry out an action that may, for example, cause a child window to appear or a drop down menu to drop down, or may cause the dialogue interpreter to communicate with the server 2 via the network N to request a further dialogue or document file in accordance with the speech command input by the user and then returns to step S5 awaiting further input. If no speech is input at step S5, then at step S7 the dialogue manager checks to see whether the user has decided to exit from this particular page or site by entering a different page or site address in the address window 60 (FIGS. 6 to 10) in known manner or has decided to close the browser by selecting exit from the file menu 61 (FIGS. 6 to 10) in known manner. If the answer at step S7 is yes, then the procedure terminates otherwise, as no speech has been input at step S5, the dialogue manager returns to step S5.

As shown in both FIGS. 6 and 7, the page or screen may also include a button 54 labelled "click here" and associated with a hyperlink that enables the user to access the same link by conventional means, that is by positioning the cursor over the button 54 using the pointing device and then selecting the button 54 in known manner, for example, clicking or double clicking where the pointing device is a mouse.

In the above described embodiments, the text associated with the speech link is clearly identified on the displayed screen or page, for example by placing the text in quotes and underlining it as shown in FIG. 6 or by underlining the text with a wavy line as shown in FIG. 7. In addition, the positioning device cursor changes from an arrow to a mouth or other symbol representing a speech link when the cursor is positioned over the speech link. This need not, however, necessarily be the case and, for example, this speech link may simply be defined by one or other of these. Thus, for example, the speech link may format the text so that it is identified (for example by placing in quotes and underlining as shown in FIG. 6) as a speech link without changing the cursor when the cursor is positioned over the speech link. As another possibility the speech link may simply instruct the dialogue manager to change the cursor from the normal cursor to the speech link identifying cursor 56 when the cursor is over the speech link without otherwise identifying the speech link. This would mean in the example shown in FIGS. 6 and 7 that the quote marks and underlining would be omitted. In this case, the user would not be aware of the presence of a speech link until the cursor was positioned over the speech link. This latter option may be used where the speech link is associated not with text but with an image or icon so that it is not necessary for the image or icon to be modified or obscured by information defining the speech link. Rather, the user discovers the existence of the speech link when they cause the pointing device cursor to pass over the area of the screen associated with the speech link. As another possibility, the speech link may simply cause the speech prompt (for example the prompt 57 shown in FIG. 9 or the prompt 58 shown in FIG. 10) to be displayed when the user positions their cursor over the area of the screen associated with the speech link.

That is without changing the cursor. This would provide the user with an immediate access to the speech prompt.

As another possibility, where the grammar file associated with the speech link allows a large number of different spoken commands to be used or the spoken commands required are self-evident to the user so that the user does not need prompting, then the prompt file may be omitted and the speech link identified by underlining or otherwise highlighting a displayed term or text associated with the speech link and/or by causing the pointing device cursor to change to a cursor uniquely identified with a speech link.

It will, of course, be appreciated that two or more speech links can be provided on the same displayed screen or page, provided that the spoken commands that activate the speech links are different from one another.

The above described embodiments provide the user with the facility to conduct a dialogue using a speech or manual (keyboard, and/or pointing device) input. The applications developer may, however, chose to design the document files so that the user has only the possibility of spoken input.

In the above described embodiments, the browser's portion of the dialogue with the user is conducted by displaying screens or pages to the user. Alternatively and/or additionally, the browser's portion of the dialogue may also include speech output to the user provided by the speech producer 33 in accordance with dialogue files received from the server 2. Where this is the case, then the prompt need not necessarily be a visual prompt but could be a speech or audible prompt. Of course, if speech output from the browser is not required, then the speech producer 33 may be omitted. In the above example, the speech producer is a speech synthesiser. The speech producer may however be provided with pre-recorded messages obviating the need for speech synthesis.

In the above described embodiments, the speech recogniser 33 is local to the browser 3. This need not necessarily be the case and, for example, the speech recogniser 34 may be accessed by the browser 3 over the network N.

In the above described embodiments, the server 2 is separate from the browser 3 and accessed via the network N. This need not necessarily be the case and, for example, the browser 3 may form part of a stand-alone computing apparatus with the server 2 being a document server forming part of that computing apparatus.

In the above described embodiments, the speech links enable the user to input a speech command to cause the browser 3 to request a link to another web page or site. This need not necessarily the case and, for example, the speech links may be the equivalent of icons, menus etc displayed on the display screen that, when the appropriate speech command is input, cause the user's computing apparatus to carry out a specific action such as, for example, opening a local file, causing a drop down menu to drop down and so on.

In the above described embodiments, the pointing device is a mouse, digitizing device or similar. Where the camera 43 is provided, then the multi-modal input manager may have, as shown in FIG. 4, a camera input 314 that includes pattern recognition software that enables the direction of the user's gaze on the screen to be determined. In this case, the location on the displayed screen at which the user's attention is directed (that is the focus) may be determined from the gaze input information rather than from the output of the pointing device.

The invention claimed is:

1. A control apparatus for enabling a user to communicate by speech with a processor-controlled apparatus, comprising:
   a display control unit that controls a display of text data which includes a speech link that can be activated by a spoken command;
   a cursor control unit that determines the location of a cursor displayed on a display from gaze input information;
   a changing unit that changes a shape of the cursor when the cursor is located over the speech link; and
   a prompt output unit that outputs a prompt identifying speech commands that can be used to activate the speech link when the cursor is displayed on the display in a changed state for a predetermined time located over the speech link.

2. The control apparatus according to claim 1, wherein the prompt output unit is operable to cause the display to display the prompt.

3. The control apparatus according to claim 2, wherein the prompt output unit is operable to display the prompt as one of a drop down menu and a list.

4. The control apparatus according to claim 1, wherein the prompt output unit is operable to output the prompt as an audio output.

5. The control apparatus according to claim 1, wherein the display control unit is operable to control the display of the speech link by causing the speech link to be displayed in a manner distinct from other text data by enclosing the text of the speech link in quotation marks or underling the text of the speech link.

6. The control apparatus according to claim 1, wherein the changing unit is operable to change the shape of the cursor to the shape of a representation of a mouth when the cursor is located over the speech link.

7. A method of enabling a user to communicate by speech with a processor-controlled apparatus, the method comprising:

controlling a display of text data which includes a speech link that can be activated by a spoken command;

determining the location of a cursor displayed on a display from gaze input information;

changing a shape of the cursor when the cursor is located over the speech link included in the displayed text data; and outputting a prompt identifying speech commands that can be used to activate the speech link if the cursor is displayed on the display in a changed state located over the speech link for a predetermined time.

8. The method according to claim 7, wherein outputting the prompt comprises causing the display to display the prompt.

9. The method according to claim 8, wherein the prompt is displayed as one of a drop down menu and a list.

10. The method according to claim 7, wherein outputting the prompt comprises providing the prompt as an audio output.

11. The method according to claim 7, wherein displaying text data which includes the speech link comprises causing the speech link to be displayed in a manner distinct from other text data by enclosing the text of the speech link in quotation marks or underlining the text of the speech link.

12. The method according to claim 7, wherein changing the shape of the cursor displayed on the display changes the cursor to the shape of a representation of a mouth when the cursor is located over the speech link.

13. A computer-readable memory medium on which is stored a computer-executed control program for enabling a user to communicate by speech with a processor-controlled apparatus, the program comprising code to perform the steps of:

controlling a display of text data which includes a speech link that can be activated by a spoken command;

determining the location of a cursor displayed on a display from gaze input information;

changing a shape of the cursor when the cursor is located over the speech link included in the displayed text data; and outputting a prompt identifying speech commands that can be used to activate the speech link if the cursor is displayed on the display in a changed state located over the speech link for a predetermined time.

* * * * *